(12) United States Patent
Kimura et al.

(10) Patent No.: US 7,923,136 B2
(45) Date of Patent: Apr. 12, 2011

(54) MAGNETIC RECORDING MEDIUM AND METHOD OF MANUFACTURING THE SAME

(75) Inventors: Kaori Kimura, Tokyo (JP); Yoshiyuki Kamata, Tokyo (JP); Satoshi Shirotori, Yokohama (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/431,671

(22) Filed: Apr. 28, 2009

(65) Prior Publication Data

US 2009/0202865 A1 Aug. 13, 2009

Related U.S. Application Data

(63) Continuation of application No. PCT/JP2008/066489, filed on Sep. 5, 2008.

(30) Foreign Application Priority Data

Sep. 28, 2007 (JP) ................................. 2007-256162

(51) Int. Cl.
*G11B 5/66* (2006.01)
(52) U.S. Cl. .................................................... 428/836.1
(58) Field of Classification Search .......................... None
See application file for complete search history.

(56) References Cited

U.S. PATENT DOCUMENTS

| 5,956,216 | A | 9/1999 | Chou | |
|---|---|---|---|---|
| 6,168,845 | B1 * | 1/2001 | Fontana et al. | 428/836 |
| 6,841,224 | B2 * | 1/2005 | Kamata et al. | 428/836.3 |
| 7,247,251 | B2 | 7/2007 | Hattori et al. | |
| 7,618,549 | B2 | 11/2009 | Shirotori et al. | |
| 7,782,562 | B2 | 8/2010 | Kamata et al. | |
| 2002/0142192 | A1 * | 10/2002 | Kamata et al. | 428/694 T |
| 2006/0012904 | A1 | 1/2006 | Naruse et al. | |
| 2006/0222898 | A1 | 10/2006 | Ichihara | |
| 2007/0054421 | A1 | 3/2007 | Ueda et al. | |
| 2007/0070547 | A1 | 3/2007 | Kamata et al. | |
| 2007/0090087 | A1 | 4/2007 | Shirotori et al. | |
| 2008/0112079 | A1 * | 5/2008 | Fullerton et al. | 360/123.02 |

FOREIGN PATENT DOCUMENTS

| JP | 03-040219 | 2/1991 |
|---|---|---|
| JP | H7-85406 | 3/1995 |
| JP | 2001-126239 | 5/2001 |
| JP | 2002-359138 | 12/2002 |
| JP | 2003-109333 | 4/2003 |
| JP | 2006-031848 | 2/2006 |
| JP | 2006-286159 | 10/2006 |
| JP | 2007-073127 | 3/2007 |
| JP | 2007-095115 | 4/2007 |
| JP | 2007-122791 | 5/2007 |

OTHER PUBLICATIONS

PCT International Search Report for application No. PCT/JP2008/066489, filed Sep. 5, 2008.
Japanese Office Action dated Oct. 25, 2010 for application No. 2007-256162 (U.S. Appl. No. 12/431,671) (English Translation).

* cited by examiner

*Primary Examiner* — Holly Rickman
(74) *Attorney, Agent, or Firm* — Blakely, Sokoloff, Taylor & Zafman LLP

(57) ABSTRACT

According to one embodiment, a magnetic recording medium includes magnetic patterns made of a ferromagnetic recording layer containing Co, and a nonmagnetic layer which separates the magnetic patterns and has a lower Co concentration than the magnetic patterns.

19 Claims, 6 Drawing Sheets

MAGNETIC RECORDING MEDIUM AND METHOD OF MANUFACTURING THE SAME

CROSS REFERENCE TO RELATED APPLICATIONS

This is a Continuation Application of PCT Application No. PCT/JP2008/066489, filed Sep. 5, 2008, which was published under PCT Article 21(2) in English.

This application is based upon and claims the benefit of priority from Japanese Patent Application No. 2007-256162, filed Sep. 28, 2007, the entire contents of which are incorporated herein by reference.

BACKGROUND

1. Field

One embodiment of the present invention relates to a magnetic recording medium capable of recording at high density and a method of manufacturing the magnetic recording medium.

2. Description of the Related Art

In the information-oriented society in recent years, the amount of data that needs to be stored in a recording medium has been continually increasing. To keep up with the increase in amount of data, there has been a demand for a recording medium and a recording apparatus with a dramatically high recording density. As regards a hard disk for which there is an increasing demand as a high-capacity and inexpensive magnetic recording medium, it is predicted that a recording density of one terabits per square inch or more, which is about ten times higher than the current recording density, will be required several years after.

In an existing magnetic recording medium used in a hard disk, one bit is recorded in a specific region of a thin film made of polycrystals of fine magnetic grains. To raise the recording capacity of the magnetic recording medium, therefore, the recording density must be increased. For this purpose, it is effective to reduce a recording mark size usable in recording per bit. If, however, the recording mark size is simply reduced, effect of recording noise caused by the shape of fine magnetic grains cannot be neglected. Instead, if the fine magnetic grains are further reduced in size, it is impossible to maintain the data recorded in fine magnetic grains at an ordinary temperature due to a problem of thermal fluctuation.

To avoid these problems, it is proposed to use a patterned medium in which dots of recording material are separated by a non-recording material in advance so as to perform read and write using a single recording dot as a single recording cell (see U.S. Pat. No. 5,956,216).

Also, as to a recent improvement in the track density of a hard disk drive (HDD), a problem of interference between adjacent tracks becomes obvious. In particular, a serious technical subject is reduction of write blurring due to fringe effect of magnetic fields from a write head. The discrete track recording-type patterned medium (DTR medium) in which recording tracks are physically separated is capable of reducing a side erase phenomenon in writing or a side read phenomenon in reading, and is capable of enhancing the track density. Therefore, the DTR medium is expected as a magnetic recording medium capable of providing a high recording density (see Jpn. Pat. Appln. KOKAI Publication No. 7-85406).

It should be noted that the term patterned medium herein includes the DTR medium since the DTR medium is also one form of the patterned media.

In conventional patterned media, a method is mainly adopted in which a ferromagnetic recording layer is etched to reach an underlayer to completely cut off the magnetic interference between magnetic patterns. However, the flying height of a head of a current hard disk drive is less than 10 nm, and stable flying of the head is not obtained if recesses having a depth corresponding to the thickness of the ferromagnetic recording layer of 20 nm to 30 nm are formed. This problem is solved by filling the recesses between the magnetic patterns with a nonmagnetic layer to flatten the surface. However, increase in the depth of the recesses leads to increase in process time.

In view of this, a method has been proposed in which recesses shallower than the thickness of the ferromagnetic recording layer are formed. However, the magnetic interference between magnetic patterns is not completely cut off only by processing a part of the ferromagnetic recording layer to form shallow recesses, which arises such a problem that signals of the adjacent track are detected as noise.

Also, a method is known in which a part of the ferromagnetic recording layer is reacted with a reactive gas or reactive solution containing halogen to chemically modify the recording layer to form a nonmagnetic layer, thereby forming magnetic patterns separated by the nonmagnetic layer (see Jpn. Pat. Appln. KOKAI Publication No. 2002-359138). However, in this method, the halogen left unremoved in the nonmagnetic layer causes corrosion.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a magnetic recording medium comprising: magnetic patterns made of a ferromagnetic recording layer containing Co; and a nonmagnetic layer which separates the magnetic patterns and has a lower Co concentration than the magnetic patterns.

According to another embodiment of the invention, there is provided a method of manufacturing a magnetic recording medium comprising: depositing a ferromagnetic recording layer containing Co on a substrate; and selectively removing Co from a part of the ferromagnetic recording layer to form magnetic patterns made of the ferromagnetic recording layer containing Co and a nonmagnetic layer which separates the magnetic patterns and has a lower Co concentration than the magnetic patterns.

Figure 1:
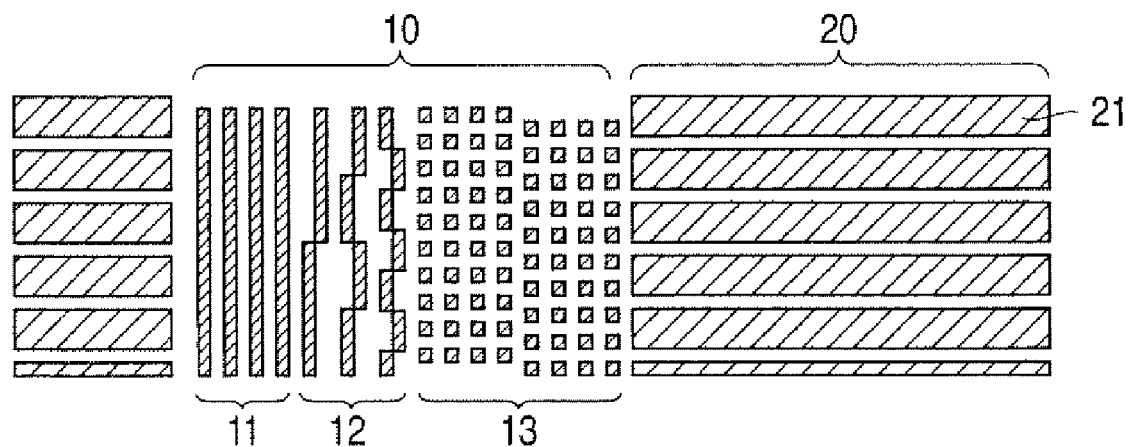
FIG. 1 is a plan view of a discrete track medium.

FIG. 1 shows a plan view of a discrete track recording medium (DTR medium) along the circumferential direction. As shown in FIG. 1, servo zones 10 and data zones 20 are alternately formed along the circumferential direction of the medium. The servo zone 10 includes a preamble section 11, an address section 12 and a burst section 13. The data zone 20 includes discrete tracks 21.

Figure 2:
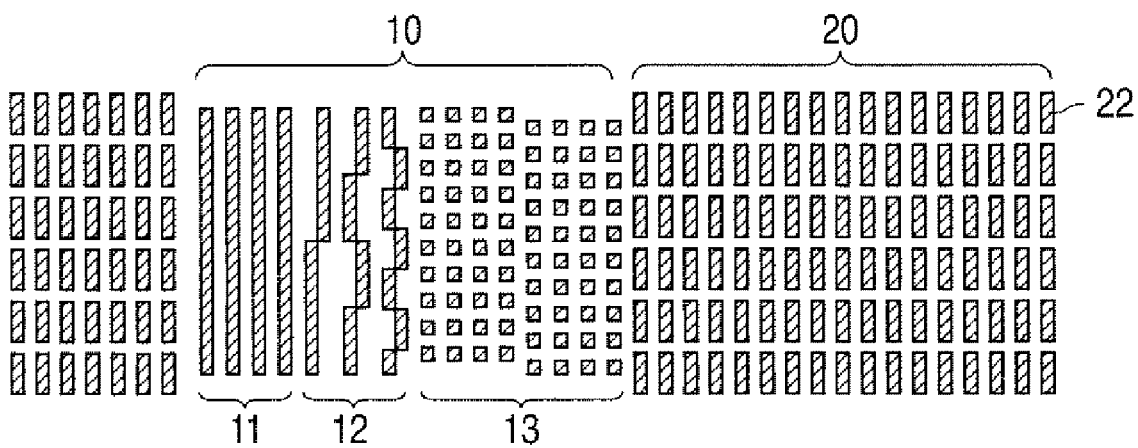
FIG. 2 is a plan view of a bit patterned medium.

FIG. 2 shows a plan view of a patterned medium in a narrower sense along the circumferential direction. In the data zones 20 in FIG. 2, magnetic dots 22 are formed in which a ferromagnetic recording layer is physically separated not only in the cross track direction but also in the down track direction.

A method of manufacturing a pattered medium according to an embodiment of the present invention will be described with reference to FIGS. 3A to 3I.

Figure 3A:
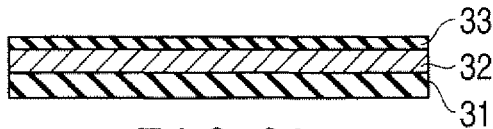
FIGS. 3A to 3I are cross-sectional views showing a method of manufacturing a patterned medium according to an embodiment of the present invention.

As shown in FIG. 3A, on a glass substrate 31, a soft magnetic underlayer made of CoZrNb with a thickness of 120 nm, an underlayer for controlling orientation made of Ru with a thickness of 20 nm, a ferromagnetic layer 32 made of CoCrPt—$SiO_2$ with a thickness of 15 nm and a protective layer 53 made of carbon (C) with a thickness of 5 nm are successively deposited. The soft magnetic underlayer and orientation control layer are not shown in the drawing for simplification.

Figure 3B:
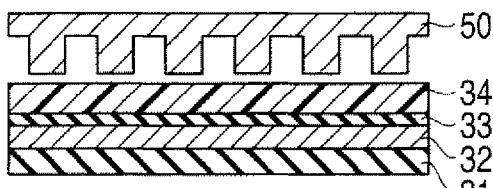

As shown in FIG. 3B, spin-on-glass (SOG) with a thickness of 100 nm is spin-coated on the protective layer 33 as a resist 34. A stamper 50 is disposed so as to face the resist 34. Patterns of protrusions and recessed inverted to those of the magnetic patterns shown in FIG. 1 are formed on the stamper 50.

Figure 3C:
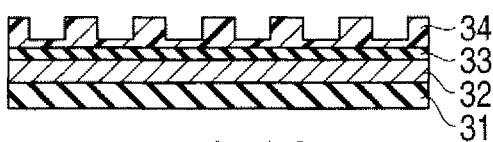

As shown in FIG. 3C, imprinting is performed by using the stamper 50 to form protrusions of the resist 34 corresponding to the recesses in the stamper 50.

Figure 3D:
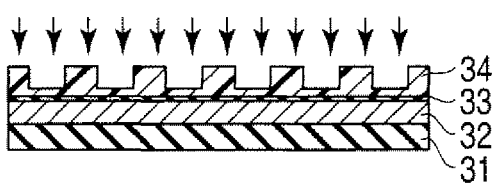

As shown in FIG. 3D, etching is performed with an ICP (inductively coupled plasma) etching apparatus to remove resist residues remaining on the bottoms of the recesses of the resist 34. The conditions in the process are as follows: for instance, $CF_4$ is used as the process gas, the chamber pressure is set to 2 mTorr, the coil RF power and the platen RF power are set to 100 W, respectively, and the etching time is set to 30 seconds.

Figure 3E:
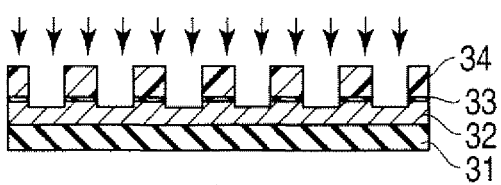

As shown in FIG. 3E, using the resist patterns (SOG) left unremoved as etching masks, ion milling is performed with an ECR (electron cyclotron resonance) ion gun to etch the protective layer 33 and the ferromagnetic recording layer 32 by a thickness of 10 nm. The conditions in the process are as follows: for instance, Ar is used as the process gas, the microwave power is set to 800 W, the acceleration voltage is set to 500V and the etching time is set to one minute.

Figure 3F:
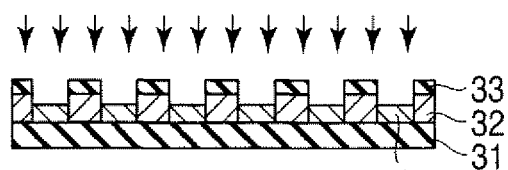

As shown in FIG. 3F, the resist patterns (SOG) are stripped off with a RIE apparatus. The conditions in the process are as follows: for instance, $CF_4$ gas is used as the process gas, the chamber pressure is set to 100 mTorr, the coil power is set to 400 W and the platen power is set to 100 W. At this time, a reaction of Co with $CF_4$ is caused on the exposed surface of the ferromagnetic recording layer 32 and then, the reaction product (considered to be $CoF_2$) is removed to form a nonmagnetic layer 35 having lower Co concentration than the original ferromagnetic recording layer 32. As a result, magnetic patterns made of the ferromagnetic recording layer 32 separated by the nonmagnetic layer 35 are formed.

Figure 3G:
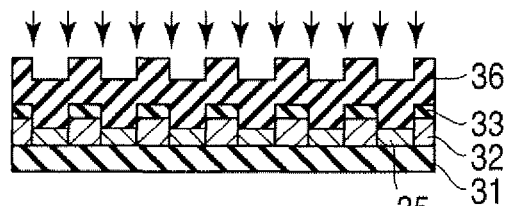
Figure 3H:
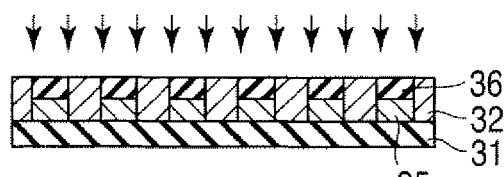
Figure 3I:
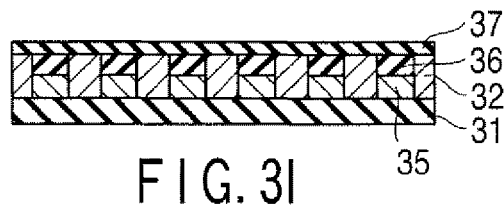

As shown in FIG. 3G, the recesses are filled with a flattening layer 36 if desired. As shown in FIG. 3H, the flattening layer 36 is etched back to flatten the surface. As shown in FIG. 3I, a surface protective film 37 made of carbon (C) is formed by CVD (chemical vapor deposition). Then, a lubricating agent is applied to the surface of the protective film 37 to provide a patterned medium according to the present invention.

Steps of forming the nonmagnetic layer 35 having lower Co concentration in the above method of manufacturing a patterned medium according to an embodiment of the present invention will be described in more detail with reference to FIGS. 4A to 4D (which correspond to FIGS. 3E and 3F).

Figure 4A:
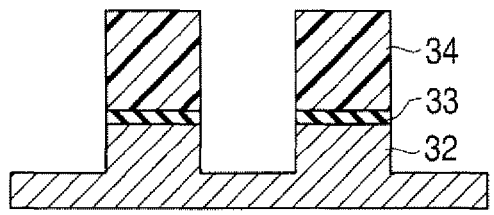
FIGS. 4A to 4D are cross-sectional views showing steps of forming a nonmagnetic layer having a lower Co concentration in a method of forming a pattered medium according to an embodiment of the present invention.

FIG. 4A shows a step of processing the ferromagnetic recording layer 32 at the part where the nonmagnetic layer is to be formed by using resist patterns made of SOG as etching resistant masks. It is preferable to use Ar ion milling for processing the ferromagnetic recording layer 32 as mentioned above.

The processing depth of the ferromagnetic recording layer 32 is designed to be shallower than the thickness of the ferromagnetic recording layer 32. In FIG. 3E, though a part of the protective film 33 and ferromagnetic recording layer 32 is processed continuously, the processing depth here means only the processing depth of the ferromagnetic recording layer 32. When the processing depth of the ferromagnetic recording layer 32 is too large, the protrusions and recessed on the surface increase, leading to deterioration in the flying stability of the head. Therefore, the ferromagnetic recording layer 32 is not necessarily etched. In the present invention, the processing depth of the ferromagnetic recording layer 32 is preferably 10 nm or less.

Also, it is only necessary that Co in the ferromagnetic recording layer 32 reacts with fluorine when Co is removed from the ferromagnetic recording layer 32 by using fluorine in the next step. Therefore, a part of the protective film (DLC) 33 may be left, as long as it is thin enough to transmit fluorine. In this case, the thickness of DLC left at the part where the nonmagnetic layer is to be formed is preferably 2 nm or less. When the thickness of DLC exceeds 3 nm, DLC prevents fluorine from transmitting, so that the reaction between Co in the ferromagnetic recording layer 32 and fluorine does not take place and therefore, no nonmagnetic layer can be formed.

A material other than DLC may be used for the protective film 33. When fluorine is used to remove Co in the ferromagnetic recording layer 32, the protective film 33 may be made of a metal such as Ru, Ni, Cr, Pt, Pd or Au, which does not react with fluorine. Since a metal such as Ta, W or Mo reacts with fluorine, such a metal is unsuitable for the protective film.

In FIG. 4S, Co in the ferromagnetic recording layer 32 is reacted with a reactant such as fluorine. This treatment includes fluorinating treatment by RIE, wet process with a hydrofluoric acid and ion milling with a mixed gas of fluorine and Ar. In the case of RIE, a fluorine-containing gas such as $CF_4$, $SF_6$ or $CHF_3$ may be used. $O_2$ or Ar may be mixed to improve the reactivity of the fluorine-containing gas. Halogens other than fluorine may be used. This reaction may be carried out either before or after the peeling of the resist. When the resist 34 is a Si-based resist such as SOG, the peeling of the resist and the reaction between Co and fluorine may be carried out at the same time using the fluorine-containing gas as shown in FIG. 4B.

Figure 4C:
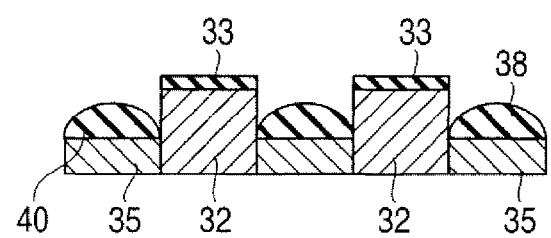
Figure 4B:
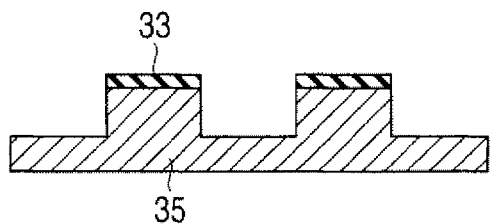

It is considered, as shown in FIG. 4C, that the fluorine-containing gas reacts with moisture in the atmosphere at this time to produce hydrofluoric acid, which is then reacted with Co contained in the ferromagnetic recording layer 32 to redeposit a reaction product 38 such as $CoF_2$ on the surface. The nonmagnetic layer 35 having a lower Co concentration than the ferromagnetic recording layer 32 is formed under the reaction product 38.

Figure 4D:
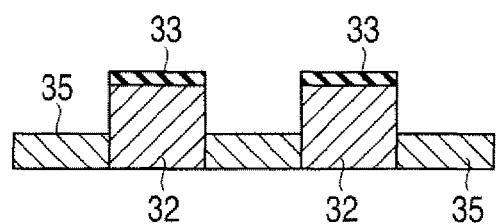

As shown in FIG. 4D, the reaction product 38 is removed to expose the nonmagnetic layer 35 having a lower Co concentration. Washing with water is a simplest method to remove the reaction product 38. However, a physical method such as Ar ion milling may be used to remove the reaction product 38. When wet process with hydrofluoric acid is carried out, a fluoride which is a reaction product can be removed at the same time, and therefore the removing step is not particularly necessary.

In the present invention, it is not necessary to react all Co existing in the ferromagnetic recording layer 32 at the part where the nonmagnetic layer 35 is to be formed. The concentration of Co in the nonmagnetic layer 35 may be 60% or less and is preferably 50% or less of the concentration of Co in the magnetic patterns made of the ferromagnetic recording layer 32. The concentration of Co in the nonmagnetic layer 35 may have such concentration distribution that it is higher in the underlayer side than in the surface side.

The magnetic interference between magnetic patterns is cut off by the nonmagnetic layer 35 formed in this manner. Also, since the reaction product has been removed, no corrosion is caused. It is expected that fine pores are produced on the surface of the nonmagnetic layer 35 with a decrease in the concentration of Co. This is useful in improving the adhesion of the nonmagnetic layer 35 to DLC of the surface protective layer to be formed in the subsequent step.

Figure 5:
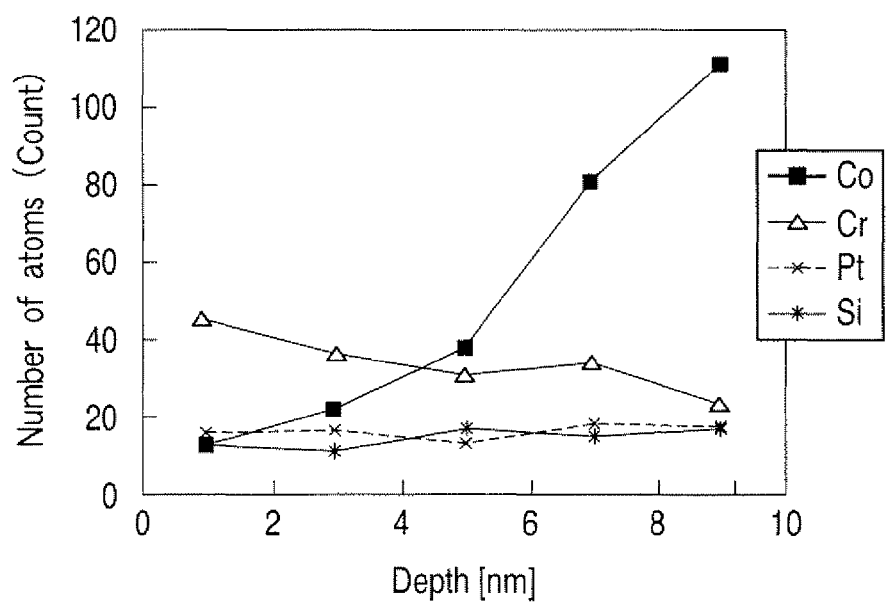
FIG. 5 is a graph showing the composition distribution of a nonmagnetic layer measured by TEM-EDX.

FIG. 5 shows the compositional distribution of the nonmagnetic layer which is measured by transmission type electron microscope-energy dispersion type X-ray analysis (TEM-EDX). The thickness of the nonmagnetic layer is 10 nm and the concentration of Co is significantly decreased on the surface side. However, the concentration of Co is increased toward the underlayer side. When the concentration of Co is higher on the underlayer side or on the recording track side, the diffusion of Co is limited, making the nonmagnetic layer resistant to compositional modification. This nonmagnetic layer contains the same constituent elements as the ferromagnetic recording layer, but no significant variation in the concentrations of constituent elements other than Co is observed.

Figure 6:
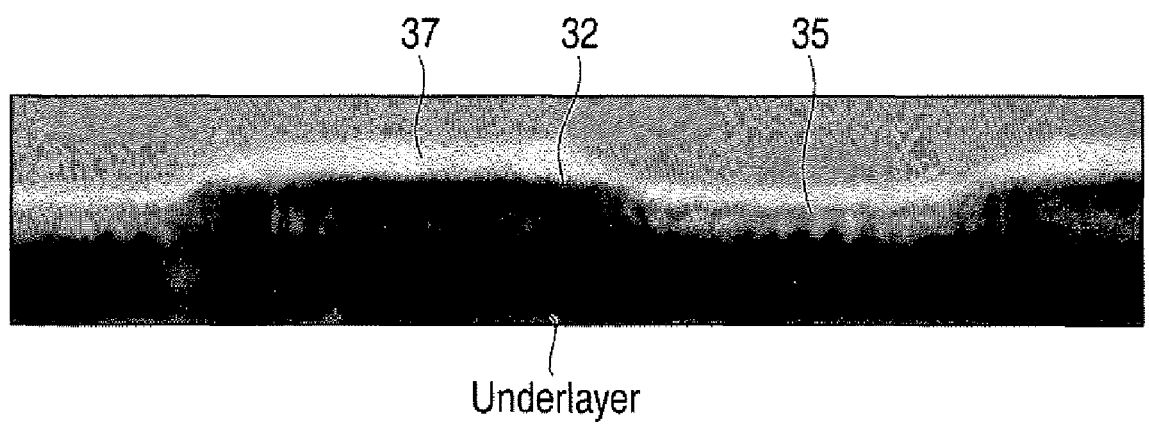
FIG. 6 is a sectional TEM photograph of a medium manufactured by the method according to the present invention.

FIG. 6 shows a sectional TEM photograph of a medium manufactured by the method of the present invention.

Next, a method of manufacturing a patterned medium according to another embodiment of the present invention will be described with reference to FIGS. 7A to 7D. FIGS. 7A to 7D correspond to FIGS. 3D to 3I but are different from FIGS. 3D to 3I in that the ferromagnetic recording layer 32 is not etched and filling and etch back of the flattening layer is not carried out.

Figure 7A:
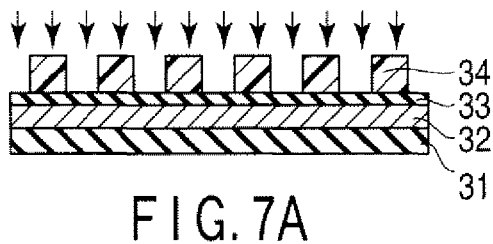
FIGS. 7A to 7D are cross-sectional views showing a method of manufacturing a patterned medium according to another embodiment of the present invention.
Figure 7B:
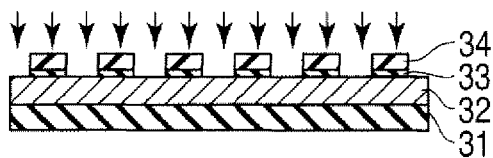
Figure 7C:
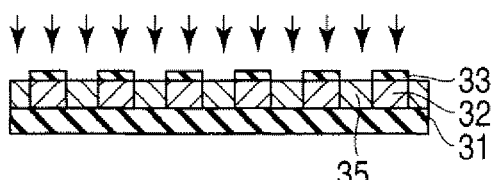
Figure 7D:
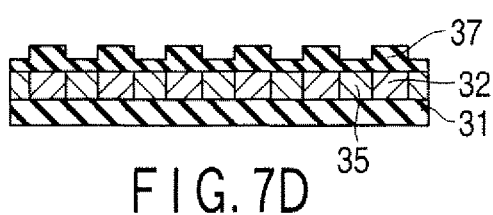

In FIG. 7A, the resist residues left unremoved on the bottoms of the recesses of the resist 34 are removed. In FIG. 7B, the protective film 33 is etched using the left resist patterns (SOG) as etching resistant masks to expose the ferromagnetic recording layer 32. In this case, however, the ferromagnetic recording layer 32 is not etched. In FIG. 7C, the resist patterns (SOG) are peeled off and a nonmagnetic layer 35 having a lower Co concentration than the original ferromagnetic recording layer 32 is formed. In FIG. 7D, a surface protective film 37 made of carbon (C) is formed by CVD.

Next, a method of manufacturing a patterned medium according to still another embodiment of the present invention will be described with reference to FIGS. 8A to 8E. Though FIGS. 8A to 8E correspond to FIGS. 3D to 3I, the steps shown in FIGS. 8A to 8E are different from those shown in FIGS. 3D to 3I in that a novolac type photoresist is used in place of SOG as the resist 39.

Figure 8A:
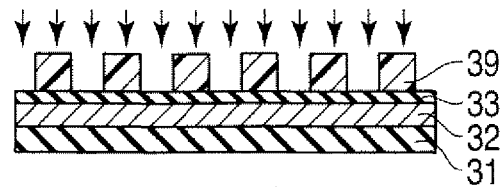
FIGS. 8A to 8E are cross-sectional views showing a method of manufacturing a patterned medium according to still another embodiment of the present invention.
Figure 8B:
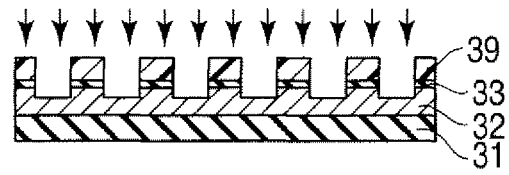
Figure 8C:
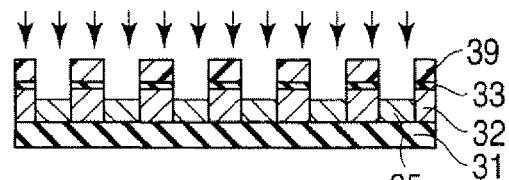
Figure 8D:
Figure 8E:
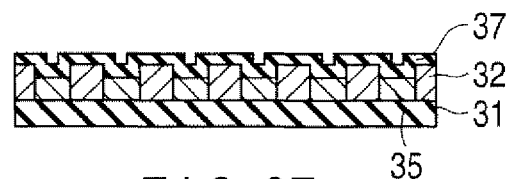

In FIG. 8A, the resist residues left on the bottoms of the recesses of the novolac type resist 39 are removed. In FIG. 8B, the protective film 33 is etched using the left resist patterns (novolac type) as etching resistant masks and a part of the ferromagnetic recording layer 32 is etched. In FIG. 8C, Co is reacted with fluorine-containing gas on the exposed ferromagnetic recording layer 32 and the reaction product is removed to form a nonmagnetic layer 35 having a lower Co concentration. In FIG. 8D, oxygen plasma treatment is carried out to peel off the resist patterns (novolac type) and the protective film (DLC) at the same time. In FIG. 8E, a surface protective film 37 made of carbon (C) is formed by CVD.

Next, preferable materials to be used in the embodiments of the present invention will be described.

<Substrate>

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

<Soft Magnetic Underlayer>

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

<Ferromagnetic Layer>

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and Coo/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

<Protective Layer>

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, $SiO_2$ or $ZrO_2$. The thickness of the protective layer is preferably 1 to 10 nm. This is preferable for high-density recording because the distance between the head and the medium can be reduced. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Next, preferred manufacturing conditions in each process in the embodiments of the present invention will be described.

<Imprinting>

A resist is applied to the surface of a substrate by spin-coating and then, a stamper is pressed against the resist to thereby transfer the patterns of the stamper to the resist. As the resist, for example, a general novolak-type photoresist or spin-on-glass (SOG) may be used. The surface of the stamper on which patterns of protrusions and recesses corresponding to servo information and recording tracks are formed is made to face the resist on the substrate. In this process, the stamper, the substrate and a buffer layer are placed on the lower plate of a die set and are sandwiched between the lower plate and the upper plate of the die set to be pressed under a pressure of 2000 bar for 60 seconds, for example. The height of the protrusions of the patterns formed on the resist by imprinting is, for instance, 60 to 70 nm. The above conditions are kept for about 60 seconds for transporting the resist to be excluded. In this case, if a fluorine-containing peeling agent is applied to the stamper, the stamper can be peeled from the resist satisfactorily.

<Removal of Resist Residues>

Resist residues left unremoved on the bottoms of the recesses of the resist are removed by RIE (reactive ion etching). In this process, an appropriate process gas corresponding to the material of the resist is used. As the plasma source, ICP (inductively coupled plasma) apparatus capable of producing high-density plasma under a low pressure is preferable, but an ECR (electron cyclotron resonance) plasma or general parallel-plate RIE apparatus may be used.

<Etching of Ferromagnetic Layer>

After the resist residues are removed, the ferromagnetic layer is processed using the resist patterns as etching masks. For the processing of the ferromagnetic layer, etching using Ar ion beams (Ar ion milling) is preferable. The processing may be carried out by RIE using Cl gas or a mixture gas of CO and $NH_3$. In the case of RIE using the mixture gas of CO and $NH_3$, a hard mask made of Ti, Ta or W is used as an etching mask. When RIE is used, the protruded magnetic patterns can be formed with good rectangularity. In processing the ferromagnetic layer by Ar ion milling capable of etching any material, if etching is carried out under the conditions that, for example, the acceleration voltage is set to 400V and incident angle of ions is varied between 30° and 70°, the protruded magnetic patterns can be formed with good rectangularity. In milling using an ECR ion gun, if etching is carried out under static opposition arrangement (incident angle of ions is 90°), the protruded magnetic patterns can be formed with good rectangularity.

<Stripping of Resist>

After the ferromagnetic layer is etched, the resist is stripped off. When a general photoresist is used as the resist, it can be easily stripped off by oxygen plasma treatment. Specifically, the photoresist is stripped off by using an oxygen ashing apparatus under the conditions that the chamber pressure is 1 Torr, power is 400 W and processing time is 5 minutes. When SOG is used as the resist, SOG is stripped off by RIE using fluorine-containing gas. As the fluorine-containing gas, $CF_4$ or $SF_6$ is suitable. Note that, it is preferable to carry out rinsing with water because the fluorine-containing gas reacts with moisture in the atmosphere to produce an acid such as HF and $H_2SO_4$. Redeposited products may be rinsed with exposure to $H_2$ plasma of $H_2O$ plasma.

<Filling of Flattening Layer>

After stripping of the resist, a flattening layer is deposited in the recesses between the magnetic patterns and on the magnetic patterns. In this step, the flattening layer is preferably deposited by usual sputtering unlikely producing process dust. The flattening layer may be selected from inorganic material, metal, metal oxide, metal nitride. Specifically, the flattening layer is selected from the group consisting of Si, SiC, SIC—C, SiOC, SiON, $Si_3N_4$, Al, $Al_xO_y$, Ti, $TiO_x$ and a mixture thereof. The bias sputtering is a method in which the flattening layer is deposited by sputtering while a bias is applied to the substrate and is capable of readily filling the recesses with the deposited flattening layer. However, since the bias to the substrate is liable to damage the substrate as well as to produce sputtering dusts, usual sputtering may be favorably used. DC sputtering is more preferable than RF sputtering, although RF sputtering may be available, because the latter tends to cause thickness dispersion of the flattening layer.

<Etch-Back of Flattening Layer>

Etch-back of the flattening layer is carried out until the ferromagnetic film (or the carbon protective film on the ferromagnetic film) is exposed. This etch-back process is preferably carried out by ion milling. When a silicon-based nonmagnetic material such as $SiO_2$ is used, the flattening layer may be etched back by RIE using a fluorine-containing gas. Etching with an ECR ion gun is also available. When $O_2$ is added to the process gas as described above, etch-back can be performed while reforming the surface of the nonmagnetic material. If the $O_2$ partial pressure is less than 1%, reforming may not be promoted. If the $O_2$ partial pressure is more than 70%, the surface of the carbon protective film may be roughened. Thus, these conditions are not preferable.

<Deposition of Protective Layer and Aftertreatment>

After etch-back, a carbon protective layer is deposited. The carbon protective layer may be deposited by CVD, sputtering or vacuum evaporation. CVD produces a DLC film containing a large amount of $sp^3$-bonded carbon. A carbon protective layer with a thickness less than 2 nm is not preferable because it results in unsatisfactory coverage. A carbon protective layer with a thickness exceeding 10 nm is not preferable because it increases magnetic spacing between a read/write head and a medium, leading to deterioration in SNR. A lubricant is applied to the surface of the protective layer. As the lubricant, for example, perfluoropolyether, fluorinated alcohol, fluorinated carboxylic acid or the like is used.

Figure 9:
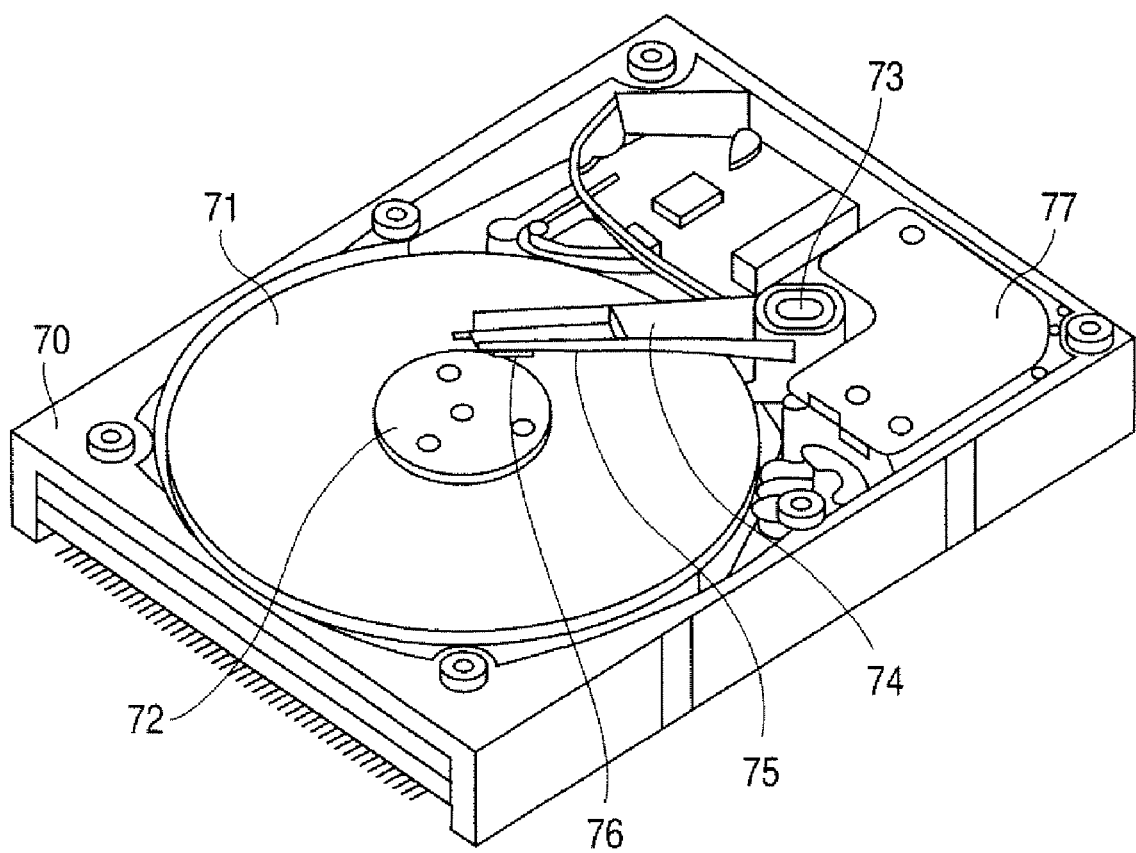
FIG. 9 is a perspective view of a magnetic recording apparatus according to an embodiment of the present invention.

FIG. 9 shows a perspective view of a magnetic recording apparatus (hard disk drive) according to an embodiment of the present invention. The magnetic recording apparatus is provided, in a chassis 70, with the above magnetic recording medium (patterned medium) 71, a spindle motor 72 that rotates the magnetic recording medium 71, a head slider 76 with a magnetic head incorporated therein, a head suspension assembly including a suspension 75 and an actuator arm 74 for supporting the head slider 76, and a voice coil motor (VCM) 77 as an actuator of the head suspension assembly.

The magnetic recording medium 71 is rotated by the spindle motor 72. A magnetic head containing a write head and a read head is incorporated into the head slider 76. The actuator arm 74 is rotatably attached to a pivot 73. The suspension 75 is attached to one end of the actuator arm 74. The head slider 76 is elastically supported via a gimbal incorporated into the suspension 75. The voice coil motor (VCM) 77 is disposed on the other end of the actuator arm 74. The voice coil motor (VCM) 77 generates a torque to the actuator arm 74 around the pivot 73 to control the position of the magnetic head such that the magnetic head is floated above an arbitrary radial position of the magnetic recording medium 71.

EXAMPLES

Example 1

Using a stamper formed with servo patterns (preamble, address, burst) and tracks as patterns of protrusions and recesses as shown in FIG. 1, a DTR medium was manufactured by the method shown in FIG. 3. The thickness of the ferromagnetic recording layer 32 was 15 nm and the thickness of the DLC protective film 33 was 5 nm. SOG was used for the resist 34. Etching was carried out using an ECR ion gun for 40 seconds to remove the DLC protective film 33 and further to carry out processing such that the depth of the recesses of the ferromagnetic recording layer 32 was 10 nm. A mixture gas of $CF_4$ and $O_2$ was used to carry out fluorine treatment. The flow rates of $CF_4$ and $O_2$ were 40 sccm and 5 sccm, respectively. The treatment time was 70 seconds. The surface geometry was observed with an atomic force microscope (AFM) to confirm that the SOG resist was peeled off and recesses having a depth of 10 nm were formed. DLC was deposited as the surface protective film 37 and a lubricating agent was applied thereto to manufacture a DTR medium.

With regard to this DTR medium, a glide test was performed, with the result that good flying characteristics were obtained. This medium was incorporated into the drive to make the evaluation of fringe characteristics. The manufactured medium had a track density of 244 kTPI and a bit pitch of 1260 kBPI. The head used for the evaluation had a read width of 80 nm and a write width of 116 nm. The error rate before recording to adjacent tracks was $10^{-6}$. The error rate after recording 1000 times to adjacent tracks was $10^{-4.5}$. It was confirmed from this result that this medium had adjacent recording resistance required for a DTR medium.

Comparative Example 1

Using the same stamper that was used in Example 1, a DTR medium was manufactured in the same method as in Example 1 except that the Co removal step was not performed. The thickness of the ferromagnetic recording layer 32 was 15 nm and the thickness of the DLC protective film 33 was 5 nm. SOG was used for the resist 34. Etching was carried out using an ECR ion gun for 40 seconds to remove the DLC protective film 33 and further to carry out processing such that the depth of the recesses of the ferromagnetic recording layer 32 was 10 nm. The fluorine treatment was not carried out and SOG was peeled off by immersing the medium in isopropyl alcohol instead. The surface geometry was observed with AFM to confirm that the SOG resist was peeled off and recesses having a depth of 10 nm were formed. DLC was formed as the surface protective film 37 and a lubricating agent was applied thereto to manufacture a DTR medium.

With regard to this DTR medium, a glide test was performed, with the result that contact between the head and the medium was made. The examination of the medium after the contact revealed that corrosion arose on DLC in the recesses. This medium was incorporated into the drive to make the evaluation of fringe characteristics in the same manner as in Example 1. The error rate before recording to adjacent tracks was $10^{-6}$. The error rate after recording 1000 times to adjacent tracks was $10^{-3.6}$. It was confirmed from this result that the medium obtained without performing the Co removal step from the recesses between the magnetic patterns had lower adjacent recording resistance.

As mentioned above, the medium of Example 1 had higher adjacent recording resistance than the medium of Comparative Example 1 obtained without removing Co. Also, the medium of Example 1 was hard to cause corrosion and therefore had strong corrosion resistance.

Example 2

Using a stamper formed with servo patterns (preamble, address, burst) and tracks as patterns of protrusions and recesses as shown in FIG. 1, a DTR medium was manufactured by the method shown in FIG. 7. The thickness of the ferromagnetic recording layer 32 was 15 nm and the thickness of the DLC protective film 33 was 5 nm. SOG was used for the resist 34. Etching was carried out using an ECR ion gun for 15 seconds to carry out processing such that the depth of the recesses was 5 nm in correspondence only with the thickness of the DLC protective film 33. A mixture gas of $CF_4$ and $O_2$ was used to carry out fluorine treatment. The flow rates of $CF_4$ and $O_2$ were 40 sccm and 5 sccm, respectively. The treatment time was 120 seconds. The surface geometry was observed with AFM to confirm that the SOG resist was peeled off and recesses having a depth of 5 nm were formed. DLC was formed as the surface protective film 37 and a lubricating agent was applied thereto to manufacture a DTR medium.

With regard to this DTR medium, a glide test was performed, with the result that good flying characteristics were obtained. This medium was incorporated into the drive to make the evaluation of fringe characteristics in the same manner as in Example 1. The error rate before recording to adjacent tracks was $10^{-6}$. The error rate after recording 1000 times to adjacent tracks was $10^{-4.5}$.

Comparative Example 2

Using a stamper formed with servo patterns (preamble, address, burst) and tracks as patterns of protrusions and recesses as shown in FIG. 1, a DTR medium was manufactured in the same manner as in Example 2 except that thick DLC was left in the etching process. The thickness of the ferromagnetic recording layer 32 was 15 nm and the thickness of the DLC protective film 33 was 5 nm. SOG was used for the resist 34. Etching was carried out using an ECR ion gun for 3 seconds to carry out processing such that the DLC protective film 33, 4 nm in thickness, was left and the depth of the recesses was 1 nm. A mixture gas of $CF_4$ and $O_2$ was used to carry out fluorine treatment. The flow rates of $CF_4$ and $O_2$ were 40 sccm and 5 sccm, respectively. The treatment time was 200 seconds. The surface geometry was observed with AFM to confirm that the SOG resist was peeled off and recesses having a depth of 1 nm were formed. DLC was formed as the surface protective film 37 and a lubricating agent was applied thereto to manufacture a DTR medium.

With regard to this DTR medium, a glide test was performed, with the result that very good flying characteristics were obtained. This medium was incorporated into the drive to make the evaluation of fringe characteristics in the same manner as in Example 1. The error rate before recording to adjacent tracks was $10^{-6}$. However, the error rate after recording 1000 times to adjacent tracks was $10^{-3.1}$. This is considered to be because the processing depth of the DLC protective film 33 was too small, only insufficient nonmagnetic layer was formed by fluorine treatment, and therefore no effect as the discrete track medium was obtained.

It was found that as mentioned above, when only the DLC protective film 33 was etched, a difference in the effect of the fluorine treatment arose depending on the thickness of the left DLC.

The thickness of DLC left in the part where the nonmagnetic layer was to be formed was changed to examine whether a servo operation was possible or not. The results are shown in Table 1. It is found from Table 1 that the thickness of DLC left in the part where the nonmagnetic layer was to be formed may be 2 nm or less.

TABLE 1

| Thickness of DLC (nm) | 0 | 1 | 2 | 3 | 4 |
|---|---|---|---|---|---|
| BER $10^{-x}$ | 4.5 | 4.6 | 4.3 | 3.3 | 3.1 |

Example 3

Using a stamper formed with servo patterns (preamble, address, burst) and tracks as patterns of protrusions and recesses as shown in FIG. 1, a DTR medium was manufactured by the method shown in FIG. 3. The thickness of the ferromagnetic recording layer 32 was 15 nm and the thickness of the DLC protective film was 5 nm. SOG was used for the resist 34. Etching was carried out using an ECR ion gun for 40 seconds, seconds or 30 seconds to remove the DLC protective film 33 and further to carry out processing such that the depth of the recesses of the ferromagnetic recording layer 32 was 10 nm, 7 nm or 5 nm. A mixture gas of $CF_4$ and $O_2$ was used to carry out fluorine treatment. The flow rates of $CF_4$ and $O_2$ were 40 sccm and 5 sccm, respectively. The treatment time was 70 seconds. DLC was formed as the surface protective film 37 and a lubricating agent was applied thereto to manufacture a DTR medium.

With regard to each medium, a glide test was performed, with the result that good flying characteristics were obtained.

Comparative Example 3

Using a stamper formed with servo patterns (preamble, address, burst) and tracks as patterns of protrusions and recesses as shown in FIG. 1, a UTR medium was manufactured in the method shown in FIG. 3. The thickness of the ferromagnetic recording layer 32 was 15 nm and the thickness of the DLC protective film 33 was 5 nm. SOG was used for the resist 34. Etching was carried out using an ECR ion gun for 44 seconds or 50 seconds to remove the DLC protective film 33 and further to carry out processing such that the depth of the recesses of the ferromagnetic recording layer was 12 nm or 15 nm. A mixture gas of $CF_4$ and $O_2$ was used to carry out fluorine treatment. The flow rates of $CF_4$ and $O_2$ were 40 sccm and 5 sccm, respectively. The treatment time was 70 seconds. DLC was formed as the surface protective film 37 and a lubricating agent was applied thereto to manufacture a DTR medium.

With regard to each DTR medium, a glide test was performed, with the result that the medium could not pass the glide test because the head collided with the medium.

As shown in Example 3 and Comparative Example 3, the medium in which the depth of the recesses of the ferromagnetic recording layer 32 was larger than 10 nm could not pass the glide test, though the medium in which the depth of the recesses of the ferromagnetic recording layer 32 was 10 nm or less was improved in head flying characteristics. It is therefore preferable that when the thickness of the magnetic pattern made of the ferromagnetic recording layer 32 is $T_m$ (nm) and the thickness of the nonmagnetic layer 35 is $T_n$ (nm), the following relationship be satisfied:

$$T_m \geq T_n \geq T_m - 10 \text{ nm}.$$

Example 4

Using a stamper formed with servo patterns (preamble, address, burst) and tracks as patterns of protrusions and recesses as shown in FIG. 1, a DTR medium was manufactured by the method shown in FIG. 3. The composition of the ferromagnetic recording layer 32 was as follows: Co: 60%, Cr: 9%, Pt: 23% and $SiO_2$: 8%, and the thickness of the ferromagnetic recording layer was 15 nm. The thickness of the DLC protective film 33 was 5 nm. SOG was used for the resist 34. Etching was carried out using an ECR ion gun for 40 seconds to remove the DLC protective film 33 and to carry out processing such that the depth of the recesses of the ferromagnetic recording layer 32 was 10 nm. A mixture gas of $CF_4$ and $O_2$ was used to carry out fluorine treatment. The flow rates of $CF_4$ and $O_2$ were 40 sccm and 5 sccm, respectively. The treatment time was 70 seconds. The surface geometry was observed with an atomic force microscope (AFM) to confirm that the SOG resist was peeled off and recesses having a depth of 10 nm were formed. DLC was formed as the surface protective film 37 and a lubricating agent was applied thereto to manufacture a DTR medium.

This medium was incorporated into the drive to make the evaluation of fringe characteristics in the same manner as in Example 1. The error rate before recording to adjacent tracks was $10^{-6}$. The error rate after recording 1000 times to adjacent tracks was $10^{-4.5}$.

With regard to a sample produced separately, the concentration of Co in each of the magnetic pattern and the nonmagnetic layer after fluorine treatment was examined by TEM-EDX. As a result, the number of Co atoms (count) in the nonmagnetic layer was 17% of that in the magnetic pattern.

Comparative Example 4

A DTR medium was manufactured in the same method as in Example 4 except that the fluorine treatment was carried out insufficiently. A mixture gas of $CF_4$ and $O_2$ was used to carry out fluorine treatment. The flow rates of $CF_4$ and $O_2$ were 40 sccm and 5 sccm, respectively, but the treatment time was reduced to 20 seconds.

This medium was incorporated into the drive to make the evaluation of fringe characteristics in the same manner as in Example 1. The error rate before recording to adjacent tracks was $10^{-6}$. The error rate after recording 1000 times to adjacent tracks was $10^{-3.6}$.

With regard to a sample produced separately, the concentration of Co in each of the magnetic pattern and the nonmagnetic layer after fluorine treatment was examined by TEM-EDX. As a result, the number of Co atoms (count) in the nonmagnetic layer was 70% of that in the magnetic pattern.

From the results shown in Example 4 and Comparative Example 4, it is found that the medium with a nonmagnetic layer having a higher Co concentration is more deteriorated in BER than the medium with a nonmagnetic layer having a lower Co concentration. This is considered to be because when the concentration of Co in the nonmagnetic layer is high, magnetic properties remain in the nonmagnetic layer, which may be a source of noise.

Example 5

A DTR medium was manufactured in the same method as in Example 1. With regard to the nonmagnetic layer after the fluorine treatment, the concentration distribution of Co in the depth direction was measured. As a result the concentration of Co in the nonmagnetic layer was 20% on average. However, the concentration of Co in the outermost surface was 5%.

DLC was formed as the surface protective film 37 and a lubricating agent was applied thereto to manufacture a DTR medium. This medium was subjected to a corrosion test, to find that no corrosion was observed.

Comparative Example 5

A DTR medium was manufactured by the conventional method by using a stamper formed with servo patterns (preamble, address, burst) and tracks as patterns of protrusions and recesses as shown in FIG. 1. The thickness of the ferromagnetic recording layer 32 was 15 nm and the thickness of the DLC protective film 33 was 5 nm. SOG was used for the resist 34. The 5-nm-thick DLC protective film 33 and the 15-nm-thick ferromagnetic recording layer 32 were completely etched using an ECR ion gun to form recesses 20 nm in depth. The SOG resist was peeled off. A 50-nm-thick flattening layer made of CoCrPt—SiO₂ (Co: 10%, Cr: 59%, Pt: 23%, SiO₂: 8%) was filled in the recesses by sputtering. Etchback of the flattening layer was carried out by 30 nm using an ECR ion gun. The filling and etchback of the flattening layer were repeated 10 times, and the surfaces of the magnetic patterns were exposed by the final etchback. The concentration of Co in this flattening layer was about 17% of that in the magnetic patterns and was almost the same as those in the nonmagnetic layers of Examples 4 and 5. The depth of the recesses of the recording track zone of the medium was about 10 nm. DLC was formed as the surface protective film 37 and a lubricating agent was applied thereto to manufacture a DTR medium.

This medium was subjected to a corrosion test, to find that corrosion was observed on the part of the flattening layer.

From the results shown in Example 5 and Comparative Example 5, it is found that the medium with a nonmagnetic layer having no concentration distribution of Co has lower resistance to corrosion than the medium with a nonmagnetic layer having a concentration distribution of Co. This is because the medium with reduced surface concentration of Co has lowered reaction amount of Co.

Example 6

Using a stamper formed with servo patterns (preamble, address, burst) and tracks as patterns of protrusions and recesses as shown in FIG. 1, a DTR medium was manufactured by the method shown in FIG. 3. The thickness of the ferromagnetic recording layer 32 was 15 nm and the thickness of the DLC protective film 33 was 5 nm. SOG was used for the resist 34. Etching was carried out using an ECR ion gun to remove the DLC protective film 33 and further to process the ferromagnetic recording layer 32 such that the depth of the recesses was 10 nm. Fluorine treatment was carried out to peel off the SOG resist, thereby forming recesses of 10 nm in thickness. A 50-nm-thick flattening layer made of NiNbTi was filled in the recesses by sputtering. Etchback of the flattening layer was carried out by 50 nm using an ECR ion gun. The filling and etchback of the flattening layer were repeated five times. The surface roughness Ra of the track zone was measured, to find that it was 1.5 nm. DLC was formed as the surface protective film 37 and a lubricating agent was applied thereto to manufacture a DTR medium. With regard to the medium, a flying test was performed, with the result that good flying characteristics were obtained.

Comparative Example 6

Using a stamper formed with servo patterns (preamble, address, burst) and tracks as patterns of protrusions and recesses as shown in FIG. 1, a DTR medium was manufactured by the conventional method. The thickness of the ferromagnetic recording layer 32 was 15 nm and the thickness of the DLC protective film 33 was 5 nm. SOG was used for the resist 34. The 5-nm-thick DLC protective film 33 and the 15-nm-thick ferromagnetic recording layer 32 were completely etched using an ECR ion gun to form recesses of 20 nm in depth. The SOG resist was peeled off. A 50-nm-thick flattening layer made of NiNbTi was filled in the recesses by sputtering. Etchback of the flattening layer was carried out by 50 nm using an ECR ion gun. The filling and etchback of the flattening layer were repeated five times. The surface roughness Ra of the track zone was measured, to find that it was 8.3 nm. DLC was formed as the surface protective film 37 and a lubricating agent was applied thereto to manufacture a DTR medium. With regard to this DTR medium, a flying test was performed. As a result, it was observed that the head flying amount dropped by about 10 nm over the servo zone of the medium.

From Example 6 and Comparative Example 6, it is found that the medium having shallow recesses can be more reduced in surface roughness than the medium having deep recesses formed by completely etching the ferromagnetic recording layer even if a flattening layer having the same thickness is used. Therefore, a medium having shallow recesses is reduced in tact time, which is advantageous in terms of manufacturing.

Example 7

Using a stamper formed with servo patterns (preamble, address, burst) and tracks as patterns of protrusions and recesses as shown in FIG. 1, a DTR medium was manufactured by the method shown in FIG. 8. The thickness of the ferromagnetic recording layer 32 was 15 nm and the thickness of the DLC protective film 33 was 5 nm. A novolac type photoresist S1801 was used for the resist 34. After imprinting, the resist residues left on the bottoms of the recesses of the resist patterns were removed by oxygen RIE. Etching was carried out using an ECR ion gun for 40 seconds to remove the DLC protective film 33 and further to carry out processing such that the depth of the recesses of the ferromagnetic recording layer 32 was 10 nm. A mixture gas of $CF_4$ and $O_2$ was used to carry out fluorine treatment. The flow rates of $CF_4$ and $O_2$ were 40 sccm and 5 sccm, respectively. The treatment time was 70 seconds. The photoresist and DLC protective film left unremoved were removed by $O_2$ ashing. The surface geometry was observed with an atomic force microscope (AFM) to confirm that the photoresist and DLC were peeled off and recesses having a depth of 10 nm were formed. DLC was formed as the surface protective film 37 and a lubricating agent was applied thereto to manufacture a DTR medium.

With regard to this DTR medium, a glide test was performed, with the result that good flying characteristics were obtained. This medium was incorporated into the drive to make the evaluation of fringe characteristics in the same manner as in Example 1. The error rate before recording to adjacent tracks was $10^{-6}$. The error rate after recording 1000 times to adjacent tracks was $10^{-4.3}$. It was confirmed from this result that this medium had the adjacent recording resistance required for a DTR medium even in the case of using a photoresist.

According to the present invention, as mentioned above, it is unnecessary to etch the ferromagnetic recording layer completely by carrying out Co removal treatment, and a patterned medium improved in fringe characteristics and flying characteristics can be produced.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording medium comprising:
    a substrate layer;
    a plurality of magnetic layers placed on the substrate layer, the plurality of magnetic patterns being made of a ferromagnetic recording layer containing cobalt (Co); and
    a recessed nonmagnetic layer placed on the substrate layer, the nonmagnetic layer separates neighboring magnetic patterns, the nonmagnetic layer having the same constituent elements as the ferromagnetic recording layer and including an underlayer side adjacent to the substrate layer having a higher Co concentration than a surface side of the nonmagnetic layer with the surface side of the nonmagnetic layer having a lower Co concentration than the magnetic patterns,
    wherein a thickness of the nonmagnetic layer being less than a thickness of the magnetic patterns.

2. The magnetic recording medium of claim 1, wherein the difference between a thickness of the nonmagnetic layer and a thickness of the magnetic patterns is ten nanometers (nm) or less.

3. The magnetic recording medium of claim 1, wherein the concentration of Co in the nonmagnetic layer is 60% or less of that in the magnetic patterns.

4. The magnetic recording medium of claim 1, wherein the nonmagnetic layer is a section of the ferromagnetic recording layer after removal of a reaction product formed on a top surface of the section of the ferromagnetic recording layer.

5. The magnetic recording medium of claim 4, wherein the reaction product is cobalt fluoride ($CoF_2$).

6. The magnetic recording medium of claim 1, wherein the nonmagnetic layer is a recessed section of the ferromagnetic recording layer formed prior to exposure to a process gas that creates a reaction product formed on and removed from a top surface of the recessed section ferromagnetic recording layer.

7. The magnetic recording medium of claim 6, wherein the reaction product is cobalt fluoride ($CoF_2$).

8. A magnetic recording medium comprising:
    a plurality of magnetic patterns, each of the plurality of magnetic patterns being made of a ferromagnetic recording layer containing cobalt (Co);
    a substrate layer on which the plurality of magnetic patterns are placed; and
    a recessed nonmagnetic layer interposed between the plurality of magnetic patterns and having a thickness less than a thickness of each of the plurality of magnetic patterns, the nonmagnetic layer being placed on the substrate layer and having the same constituent elements as each of the plurality of magnetic patterns but having a lower Co concentration than each of the plurality of magnetic patterns,
    wherein the concentration of Co in the nonmagnetic layer is higher on an underlayer side of the nonmagnetic layer adjacent to the substrate layer than on a surface side of the nonmagnetic layer.

9. The magnetic recording medium of claim 8, wherein a difference between a thickness of the nonmagnetic layer and a thickness of each of the plurality of magnetic patterns is ten nanometers (nm) or less.

10. The magnetic recording medium of claim 8, wherein the concentration of Co in the nonmagnetic layer is 60% or less of that in each of the plurality of magnetic patterns.

11. The magnetic recording medium of claim 8, wherein the nonmagnetic layer is a section of the ferromagnetic recording layer remaining after removal of a reaction product formed on a top surface of the section of the ferromagnetic recording layer.

12. The magnetic recording medium of claim 11, wherein the reaction product is cobalt fluoride ($CoF_2$).

13. The magnetic recording medium of claim 8, wherein the nonmagnetic layer is a recessed section of the ferromagnetic recording layer formed prior to exposure to cobalt tetrafluoride ($CoF_4$) that creates a reaction product formed on and subsequently removed from a top surface of the recessed section ferromagnetic recording layer.

14. The magnetic recording medium of claim 13, wherein the reaction product is cobalt fluoride ($CoF_2$).

15. A magnetic recording medium comprising:
    a substrate layer;
    a plurality of magnetic patterns situated on the substrate layer, each of the plurality of magnetic patterns being made of a ferromagnetic recording layer containing cobalt (Co); and
    a recessed nonmagnetic layer interposed between the plurality of magnetic patterns and having a thickness less than a thickness of each of the plurality of magnetic patterns, the nonmagnetic layer being placed on the substrate layer and being formed only with the same constituent elements as used to form each of the plurality of magnetic patterns, the nonmagnetic layer having a lower Co concentration than each of the plurality of magnetic patterns.

16. The magnetic recording medium of claim 15, wherein the Co concentration in the nonmagnetic layer is higher at an underlayer side of the nonmagnetic layer that is adjacent to the substrate layer than on a surface side of the nonmagnetic layer.

17. The magnetic recording medium of claim 15, wherein a difference between a thickness of the nonmagnetic layer and a thickness of each of the plurality of magnetic patterns is ten nanometers (nm) or less.

18. The magnetic recording medium of claim 15, wherein the nonmagnetic layer is a section of the ferromagnetic recording layer remaining after removal of a reaction product formed on a top surface of the section of the ferromagnetic recording layer.

19. The magnetic recording medium of claim 18, wherein the reaction product is cobalt fluoride ($CoF_2$).

* * * * *